(12) United States Patent
Nadler (10) Patent No.: US 11,210,529 B2
(45) Date of Patent: Dec. 28, 2021

(54) AUTOMATED SURVEILLANCE SYSTEM AND METHOD THEREFOR

(71) Applicant: Darvis, Inc., San Francisco, CA (US)

(72) Inventor: Ingo Nadler, Bad Breisig (DE)

(73) Assignee: Darvis, Inc., San Francisco, CA (US)

( * ) Notice: Subject to any disclaimer, the term of this patent is extended or adjusted under 35 U.S.C. 154(b) by 5 days.

(21) Appl. No.: 16/800,064

(22) Filed: Feb. 25, 2020

(65) Prior Publication Data

US 2020/0387716 A1  Dec. 10, 2020

Related U.S. Application Data

(60) Provisional application No. 62/856,809, filed on Jun. 4, 2019.

(51) Int. Cl.
*G06K 9/00* (2006.01)
*G06K 9/32* (2006.01)
(Continued)

(52) U.S. Cl.
CPC ..... *G06K 9/00771* (2013.01); *G06K 9/00268* (2013.01); *G06K 9/00335* (2013.01);
(Continued)

(58) Field of Classification Search
CPC ........... G06K 9/00778; G06K 9/00744; G06K 9/00771; G06K 9/00288; G06K 9/00671;
(Continued)

(56) References Cited

U.S. PATENT DOCUMENTS

| 2008/0192118 A1* | 8/2008 | Rimbold | H04N 5/23299 348/159 |
| 2010/0013931 A1* | 1/2010 | Golan | G06T 7/70 348/150 |

(Continued)

OTHER PUBLICATIONS

SmartMonitor—An Intelligent Security System for the Protection of Individuals and Small Properties with the Possibility of Home Automation (Year: 2014).*

(Continued)

*Primary Examiner* — Nizar N Sivji
(74) *Attorney, Agent, or Firm* — Ziegler IP Law Group, LLC (57) ABSTRACT

A system including a server arrangement and a programming interface in communication with external applications are provided. The server arrangement (i) acquires data from sensors, (ii) analyzes the data to determine at least one object of interest in a surveillance area, (iii) determines type of the at least one object of interest, one or more attributes associated with the at least one object of interest and a geospatial location of the at least one object of interest, (iv) estimates a state of the at least one object of interest based on the type of the at least one object, one or more attributes and the geospatial location; (v) compares the estimated state with a defined set of trigger conditions associated with surveillance area, and (vi) determines at least one action to be taken in the surveillance area based on the estimated state of the at least one object of interest matching with at least one of the trigger conditions. The programming interface triggers an external application to perform a determined action to be taken when the estimated state matches with trigger conditions.

26 Claims, 5 Drawing Sheets

(51) Int. Cl.
*G06K 9/20* (2006.01)
*H04W 4/14* (2009.01)
*G06T 7/73* (2017.01)

(52) U.S. Cl.
CPC .......... *G06K 9/209* (2013.01); *G06K 9/3241* (2013.01); *G06T 7/74* (2017.01); *H04W 4/14* (2013.01); *G06T 2207/30232* (2013.01); *G06T 2207/30242* (2013.01)

(58) Field of Classification Search
CPC .......... G06K 9/00785; G06K 9/00221; G06K 9/00335; G06K 9/3241; G06K 9/209; G06K 9/00268; H04N 5/23299; H04N 7/188; H04L 67/12; H04W 4/38; H04W 4/021; H04W 4/14; G06T 7/73; G06T 2207/30196; G06T 7/20; G06T 7/74; G06T 2207/30242; G06T 2207/30232
See application file for complete search history.

(56) References Cited

U.S. PATENT DOCUMENTS

| | | | | |
|---|---|---|---|---|
| 2010/0123579 | A1* | 5/2010 | Midkiff | G08B 13/19697 340/541 |
| 2012/0106797 | A1* | 5/2012 | Wang | G06K 9/00771 382/103 |
| 2013/0201329 | A1* | 8/2013 | Thornton | H04N 7/18 348/143 |
| 2015/0097948 | A1* | 4/2015 | Bostrom | G06T 7/80 348/137 |
| 2017/0178345 | A1* | 6/2017 | Pham | G06T 7/277 |
| 2017/0323458 | A1* | 11/2017 | Lablans | G06F 16/29 |
| 2018/0007288 | A1* | 1/2018 | Klein | G06T 7/70 |
| 2018/0124331 | A1* | 5/2018 | Min | G06K 9/00771 |
| 2018/0173963 | A1* | 6/2018 | Taylor | G06T 3/00 |
| 2018/0278894 | A1* | 9/2018 | Kanga | G06K 9/00369 |
| 2019/0087952 | A1* | 3/2019 | Milbert | G06T 7/0002 |
| 2019/0180456 | A1* | 6/2019 | Razumkov | G06T 7/292 |
| 2019/0325230 | A1* | 10/2019 | Nadler | G06K 9/00744 |
| 2019/0333233 | A1* | 10/2019 | Hu | A61B 5/0077 |
| 2020/0082851 | A1* | 3/2020 | Chau | G06K 9/00771 |
| 2020/0105111 | A1* | 4/2020 | Messer | G08B 13/19656 |

OTHER PUBLICATIONS

A Case Study on smart Surveillance Application System using WSN and IP webcam (Year: 2014).*

Active-Vision-Based Multisensor Surveillance—An Implementation (Year: 2006).*

Algorithms for Cooperative Multisensor Surveillance (Year: 2001).*

* cited by examiner

AUTOMATED SURVEILLANCE SYSTEM AND METHOD THEREFOR

TECHNICAL FIELD

The present disclosure relates generally to surveillance systems; more specifically, to a system that automatically triggers actions in a surveillance area based on one or more changes therein. Furthermore, the present disclosure relates to a method for automatically triggering actions in a surveillance area based on one or more changes therein.

BACKGROUND

In recent years, safety and security have emerged as major concerns. Typically, surveillance systems are employed for tracking people and vehicles. The surveillance systems are employed in schools, houses, airports, railway stations, hotels, state government buildings, tourist places and other crowded places. Such conventional surveillance systems are utilized to detect and track suspicious people, criminals, fugitives and the like.

However, the conventional surveillance systems have shortcomings and technical problems. One major problem is that data obtained for monitoring a particular area is to analyzed manually by an individual. The manual analysis is not only a tedious task, but also time consuming and prone to inaccuracies. Another major problem of the surveillance systems is that the conventional systems are not capable of reporting any unusual activity or trend in a particular area; for example, detecting weapons in a highly restricted zone. Furthermore, the conventional surveillance systems typically fail to identify trends associated with a particular area and notify an authority or general masses regarding the same. Furthermore, the conventional systems are not responsive to a given environment or area that they are meant to monitor. In other words, the conventional systems are passive and do not automatically respond to events occurring in an environment. Hence, the systems known in the art are merely used for capturing video feeds from a surveillance area, but fail to any provide useful information or take any useful action about the surveillance area.

Therefore, in light of the foregoing discussion, there exists a need to overcome the aforementioned drawbacks associated with conventional surveillance systems and the procedures for analyzing surveillance system feed. In particular, there is a need to provide computing and control systems that are specifically configured to monitor real-time data and capable of performing actions based on the same.

SUMMARY

The present disclosure seeks to provide a system that triggers actions in response to events occurring in a surveillance area. Furthermore, the present disclosure also seeks to provide a method for triggering actions in response to events occurring in the surveillance area. The present disclosure provides at least a partial solution to the aforementioned technical problem, or problems, associated with known art. The present disclosure seeks to provide a solution to the existing problem of a lack of accurate and reliable systems for responding to situations in a surveillance area and for acting accordingly in real-time. Furthermore, the present disclosure seeks to provide a solution to the existing problem of delayed detection of catastrophic events such as violence, fire break-out, riots, and the like, and a lack of an immediate response to the same. An aim of the present disclosure is to provide a system that at least partially overcomes the problems encountered in the prior art, and allows for automatically and immediately responding to situations in a surveillance area, and responsively performing actions based on the same.

In one aspect, the present disclosure provides a system comprising:
a server arrangement in communication with a plurality of sensors arranged in a surveillance area, wherein the server arrangement is configured to:
acquire data from the plurality of sensors;
analyze the acquired data to determine at least one object of interest in the surveillance area, a type of the at least one object of interest, one or more attributes associated with the at least one object of interest and a geospatial location of the at least one object of interest;
estimate a state of the at least one object of interest within the surveillance area based on the type of the at least one object of interest, the determined one or more attributes of the at least one object of interest and the geospatial location of the at least one object of interest;
compare the estimated state of the at least one object of interest with a defined set of trigger conditions associated with the surveillance area; and
determine at least one action to be taken in the surveillance area based on the estimated state of the at least one object of interest matching with at least one of the trigger conditions from the defined set of trigger conditions in the comparison; and
a programming interface in communication with the server arrangement and at least one external application, wherein the programming interface is configured to trigger the at least one external application to perform the determined at least one action to be taken when the estimated state of the at least one object of interest matches with at least one of the trigger conditions from the defined set of trigger conditions.

Optionally, the server arrangement is further configured to track change in the state of the at least one object of interest in the surveillance area.

Optionally, the server arrangement is further configured to mark the triggered at least one action as complete or incomplete based on the change in state of the at least one object of interest.

Optionally, the server arrangement is further configured to define at least one zone in the surveillance area, wherein the set of trigger conditions are defined based on the at least one zone in the surveillance area. For example, spatially-defined lines can be defined in the surveillance area, and serve as trigger conditions; for example, when an unclean bed as an object crosses a given line into a room, the room is also receives an unclean attribute, or an alarm is triggered when a person that is not recognized as staff crosses the given line.

Optionally, the at least one object of interest is a person, and wherein the state of the at least one object of interest includes one or more of: facial features of the person, facial expressions of the person, physical attributes of the person, a physical condition of the person, a movement of the person and clothing of the person. Optionally, the at least one object of interest is an inanimate entity, and wherein the state of the at least one object of interest includes one or more of: a physical condition of the inanimate entity, a working condition of the inanimate entity, a movement of the inanimate entity, a cleanliness condition of the inanimate entity and an occupancy condition of the inanimate entity. Optionally, the set of trigger conditions include one or more of: a count of the at least one object of interest in the surveillance area, a duration of a current state of the at least one object of interest, a frequency of change of the state of the at least one object of interest, and one or more threshold values of a state of the object of interest.

Optionally, the at least one action includes one or more of: sending data to a node, sending a text message or an email message to one or more recipients, displaying information on a screen, and activating a device.

Optionally, the server arrangement is configured to transform the coordinates of an image plane from the video feed to corresponding coordinates in a map of the surveillance area, for determining the geospatial location of the at least one object of interest.

Optionally, the server arrangement is further configured to determine a unique object identity for the at least one object of interest based on the one or more attributes of the at least one object of interest.

Optionally, the plurality of sensors comprises one or more cameras configured to capture video feed of the surveillance area.

Optionally, the server arrangement is configured to capture one or more image frames from the video feed for analysis.

Optionally, the plurality of sensors comprises one or more of a RADAR, a LIDAR, a Bluetooth® beacon, a microphone array, an ultra-wide band beacon, a proximity sensor, and a combination of cell tower.

In another aspect, the present disclosure provides a method comprising:
  acquiring data from a plurality of sensors;
  analyzing the acquired data to determine at least one object of interest in the surveillance area, a type of the object of interest, one or more attributes associated with the at least one object of interest and a geospatial location of the object of interest;
  estimating a state of the at least one object of interest based on the type of the object of interest, the determined one or more attributes of the at least one object of interest and the geospatial location of the at least one object of interest;
  comparing the estimated state of the at least one object of interest with a defined set of trigger conditions associated with the surveillance area; and
  determining at least one action to be taken in the surveillance area based on the estimated state of the at least one object of interest matching with at least one of the trigger conditions from the defined set of trigger conditions in the comparison; and
  triggering the at least one external application to perform the determined at least one action to be taken when the estimated state of the at least one object of interest matches with at least one of the trigger conditions from the defined set of trigger conditions.

Optionally, the method further comprises tracking a change in the state of the at least one object of interest in the surveillance area.

Optionally, the method further comprises configuring to mark the triggered at least one action as complete or incomplete based on the change in state of the at least one object of interest.

Optionally, the method further comprises defining at least one zone in the surveillance area, wherein the set of trigger conditions are defined based on the at least one zone in the surveillance area.

Optionally, the at least one object of interest is a person, and wherein the state of the at least one object of interest includes one or more of: facial features of the person, facial expressions of the person, physical attributes of the person, a physical condition of the person, a movement of the person and clothing of the person.

Optionally, the at least one object of interest is an inanimate entity, and wherein the state of the at least one object of interest includes one or more of: a physical condition of the inanimate entity, a working condition of the inanimate entity, a movement of the inanimate entity, a cleanliness condition of the inanimate entity and occupancy condition of the inanimate entity.

Optionally, the set of trigger conditions include one or more of: a count of the at least one object of interest in the surveillance area, a duration of a current state of the at least one object of interest, a frequency of change of the state of the at least one object of interest, and one or more threshold values of a state of the object of interest.

Optionally, the at least one action includes one or more of: sending data to a node, sending a text message or an email message to one or more recipients, displaying information on a screen, and activating a device.

Optionally, the method further comprises transforming the coordinates of an image plane from the video feed to corresponding coordinates in a map of the surveillance area, for determining the geospatial location of the at least one object of interest.

Optionally, the method further comprises determining a unique object identity for the at least one object of interest based on the one or more attributes of the object of interest.

Optionally, the plurality of sensors comprises one or more cameras configured to capture video feed of the surveillance area.

Optionally, the method further comprises capturing one or more image frames from the video feed for analysis.

Optionally, the plurality of sensors comprises one or more of a RADAR, a LIDAR, a Bluetooth® beacon, a microphone array, an ultra-wide band beacon, a proximity sensor, and a combination of cell tower.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In overview, the embodiments of the present disclosure are concerned with a system for triggering automated actions in a surveillance area based on a change in an object of interest within the surveillance area. Furthermore, the embodiments of the present disclosure also provide a method for triggering automated actions in a surveillance area.

Figure 1:
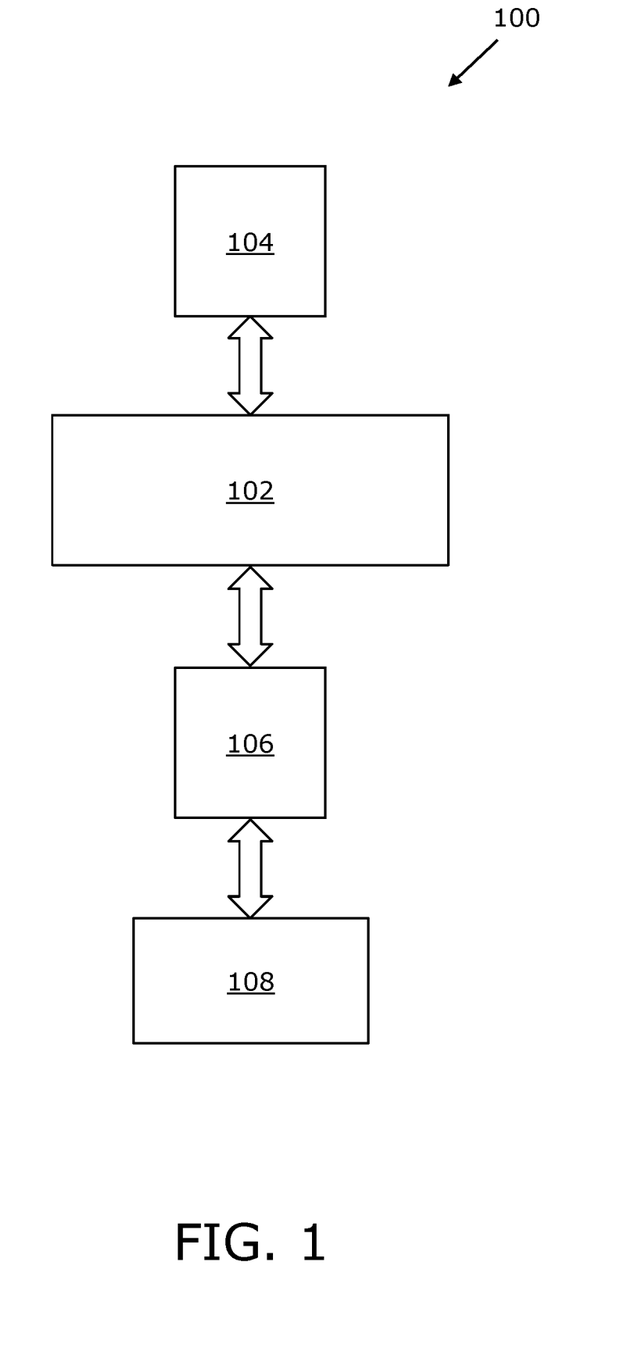
FIG. 1 is an illustration of a block diagram of a system for triggering actions in a surveillance area, in accordance with an embodiment of the present disclosure.

Referring to FIG. 1, there is shown a block diagram of a system 100 for triggering automated actions in a surveillance area, in accordance with an embodiment of the present disclosure. For illustration purposes only, there will now be considered an exemplary environment, wherein the system 100 is implemented pursuant to embodiments of the present disclosure. As shown, the system 100 comprises a server arrangement 102 that is communicatively coupled to a plurality of sensors 104. Furthermore, the system 100 comprises a programming interface 106 and an external application 108. Herein, the programming interface 106 is communicatively coupled to the server arrangement 102 and the external application 108.

It will be appreciated that FIG. 1 is merely an example, which should not unduly limit the scope of the claims herein. It is to be understood that the specific designation for the system 100 is provided as an example and is not to be construed as limiting the system 100 to specific numbers, types, or arrangements of server arrangement (such as server arrangement 102), plurality of sensors (such as sensors 104), programming interfaces (such as programming interface 106), and external applications (such as external application 108). A person skilled in the art will recognize many variations, alternatives, and modifications of embodiments of the present disclosure.

Throughout the present disclosure, the term "server arrangement" relates to a structure and/or module that include programmable and/or non-programmable components configured to store, process and/or share information. Optionally, the server arrangement 102 includes any arrangement of physical or virtual computational entities capable of enhancing information to perform various computational tasks. Furthermore, it should be appreciated that the server arrangement 102 is optionally a single hardware server or a plurality of hardware servers operating in a parallel or distributed architecture. In an example, the server arrangement 102 optionally includes components such as memory, a processor, a network adapter and the like, to store, process and/or share information with other computing components, such as user device/user equipment. Optionally, the server arrangement 102 is implemented as a computer program that provides various services (such as database service) to other devices, modules or apparatus.

The server arrangement 102 is configured to acquire data from the plurality of sensors 104. Notably, the plurality of sensors 104 is arranged in the surveillance area for acquiring data. Throughout the present disclosure, the term "sensors" as used herein refers to an assembly or arrangement of a number of sensors 104 and if necessary, any other peripheral devices or components required for operation of the sensors 104, and transmittance or communication of sensor data. Furthermore, the sensors 104 include a device that detects (and optionally responds to) signals, stimuli or changes in quantitative and/or qualitative features of a given system, or the environment in general, and provides a corresponding output. The output is generally a signal that can be converted to human-readable format at a location of the sensors 104 or transmitted electronically over a network for reading or further processing. Additionally, the sensors 104 optionally include any device which can provide a form of perceived perceptual information. In particular, the plurality of sensors 104 is configured to acquire data for monitoring the surveillance area. In an example, the data acquired by the plurality of sensors 104 are a number of vehicles on a street, a number of people on a street, a number of obstacles on a street hindering flow of traffic along the street, a movement of vehicles, a heat signature of a particular area, an index of air quality (AQI) in a particular area, an amount of humidity or water vapor in a particular area, and so forth. The data acquired by the plurality of sensors 104 is used to monitor activity in the surveillance area.

According to an embodiment, the plurality of sensors 104 comprise one or more cameras that are configured to capture video feed of the surveillance area. Notably, the one or more cameras are arranged in a surveillance area at all required locations and at mutually different angles, to capture a full 360° view of the surveillance area, and thereby capture a continuous and uninterrupted video feed of the surveillance area. It will be appreciated that the one or more cameras include, but are not limited to, rotatable cameras, box cameras, infra-red cameras, optical cameras, thermal (FLIR) cameras, and dome cameras. Optionally, the plurality of sensors 104 comprises one or more of a RADAR, a LIDAR, a Bluetooth® beacon, a microphone array, an ultra-wide band beacon, a proximity sensor, and a combination of cell tower. More optionally, the plurality of sensors 104 includes motion detectors, magnetic anomaly detectors, metal detectors, heat detectors, smoke detectors and so forth. In an example, the plurality of sensors 104 are employed at entrances of buildings, houses, shopping malls and the like to keep a check on people entering and leaving. In another example, the plurality of sensors 104 are employed at traffic signals to track traffic of vehicles and people. In another example, the plurality of sensors 104 are employed in a hospital or healthcare establishment to monitor continuously a state of patients, equipment or medical instruments in the hospital or the healthcare establishment. In yet another example, the plurality of sensors 104 are installed in a shopping mall area to determine presence of visitors associated with a particular gender in the shopping mall area and so forth. In yet another example, the plurality of sensors 104 are mounted on unmanned aerial vehicles (UAVs), micro aerial vehicles (MAVs) and the like to acquire effectively data pertaining to a particular object. The data provided by the plurality of sensors 104 is optionally provided in mutually different formats that include, but are not limited to, .JPEG, .MP3, .MP4, .XML, and .JSON formats. Optionally, the plurality of sensors 104 include transmitters to transmit the data acquired from the surveillance area.

The sensors 104 are configured to transmit data over a communication network. Throughout the present disclosure, the term "communication network" as used herein refers to an arrangement of interconnected programmable and/or non-programmable components that are configured to facilitate data communication between one or more electronic devices and/or databases, whether available or known at the time of filing or as later developed. Furthermore, the network optionally includes, but is not limited to, one or more peer-to-peer network, a hybrid peer-to-peer network, local area networks (LANs), radio access networks (RANs), metropolitan area networks (MANS), wide area networks (WANs), all or a portion of a public network such as the global computer network known as the Internet®, a private network, a cellular network and any other communication system or systems at one or more locations. Additionally, the network includes wired or wireless communication that can be carried out via any number of known protocols, including, but not limited to, Internet Protocol (IP), Wireless Access Protocol (WAP), Frame Relay, or Asynchronous Transfer Mode (ATM). Moreover, any other suitable protocols using voice, video, data, or combinations thereof, can also be employed. Moreover, although the system 100 is frequently described herein as being implemented with TCP/IP communications protocols, the system 100 is also optionally implemented using IPX, AppleTalk, IP-6, NetBIOS, OSI, any tunneling protocol (e.g. IPsec, SSH), or any number of existing or future protocols.

Notably, the server arrangement 102 is configured to acquire data from the plurality of sensors 104 over the communication network. In an example, each of the plurality of sensors 104 comprises a transmitter to transmit the data to the server arrangement 102. In another example, each of the plurality of sensors 104 is configured to store the captured data in a database (not shown) associated therewith. In such a case, the server arrangement 102 is configured to acquire the required data from the database. In yet another example, each of the plurality of sensors 104 are configured to perform functions of the server arrangement 102, such as processing of the data acquired therein, as discussed later in detail. In such a case, the analyzed data is transmitted to the server arrangement 102 for further determination of actions to be taken.

Throughout the present disclosure, the term "surveillance area" as used herein refers to the area which is monitored for security and/or analysis for patterns or statistics, and further defining or triggering an action based on the same. Generally, the surveillance area corresponds to a coverage area of the plurality of sensors 104 arranged therein. The surveillance area is a well-defined area; alternatively, the surveillance area is an unclearly defined area. The surveillance area is, for example, a stationary venue such as a building or a mobile venue such as mass transit vehicles including trains, buses, ferries, aircraft, automobiles and so forth. Moreover, the surveillance area depends on the area over which the plurality of sensors 104 are arranged. In an example, a plurality of sensors 104 are arranged in a private path to a house, such that the plurality of sensors 104 acquire data associated with the private path. Herein, the private path is considered as the surveillance area. In another example, a plurality of sensors 104 are arranged to monitor a city, therefore the city is the surveillance area. In yet another example, the plurality of sensors 104 are arranged in a hospital building, therefore the hospital building is the surveillance area. It will be appreciated that the surveillance area is optionally monitored for unidentified vehicles in a security zone, unattended baggage at airports, unidentified people in a high security zone, wanted people such as fugitives or criminals, a condition of one or more vehicles, a speed of one or more vehicles passing along a street, a number of people in a particular area and so forth.

The server arrangement 102 is configured to analyze the acquired data to determine at least one object of interest in the surveillance area, one or more attributes associated with the at least one object of interest and a geospatial location of the at least one object of interest. Notably, the data acquired from the plurality of sensors 104 is optionally continuously monitored by analyzing the acquired data in real-time or near real-time. Herein, the at least one object of interest is based on a defined set of trigger conditions associated with the surveillance area. It will be appreciated that the at least one object of interest can be any object in the surveillance area whose actions, presence or state potentially causes a difference in the surveillance area. Optionally, the object of interest is defined according to a property of the surveillance area, or may be determined by the server arrangement 102 based on analyzed data acquired by the plurality of sensors 104. In an example, the at least one object of interest on a street includes vehicles and/or people. In another example, the at least one object of interest in a shopping mall includes one or more people.

It will be appreciated that the data acquired from each of the plurality of sensors is beneficially analyzed in varied ways, depending on a source of the acquired data. As an example, the technique for analysis of camera feed, LIDAR, RADAR, audio beacon and Bluetooth beacon would be mutually different. Optionally, in a case of the sensors 104 being cameras, the server arrangement 102 is configured to capture one or more image frames from the video feed for analysis. Specifically, the video feed captured via the cameras is analyzed by capturing one or more image frames from the video feed. In an example, the number of objects of interest in a video feed (or captured image frames) are determined by segmentation techniques known in the art.

Optionally, the server arrangement 102 is configured to define at least one zone in the surveillance area. Notably, the at least one zone is defined on a basis of a common criteria or a common action to be triggered. The at least one zone is an area with defined co-ordinates within the surveillance area that is to be monitored. Notably, the surveillance area is monitored for an extended field of view analysis and potentially triggers multiple actions in mutually different areas of the surveillance area, whereas the at least one zone is monitored for a closer analysis within the surveillance area and potentially triggers a common action. As an example, the surveillance area is a city, and each street within the city is designated to be a corresponding zone; for example, areas like, parks, schools, colleges, government institutions within the city are mutually different zones in the surveillance area. However, it will be appreciated that the terms "surveillance area" and "at least one zone" potentially overlap with each other, and therefore the two terms have, sometimes, been interchangeably used in the present disclosure.

As aforementioned, the server arrangement 102 is configured to analyze the acquired data to determine one or more attributes associated with the object of interest. Herein, for example, the one or more attributes refer to a shape of the object of interest, a size of the object, a color of the object and so forth. Specifically, the server arrangement 102 is configured to identify each of the objects of interest in the area of interest by performing feature extraction thereupon. The feature extraction techniques employed herein are used to extract features from the acquired data for object detection. Furthermore, machine learning algorithms are beneficially employed for performing object recognition on the detected objects. There are several processing operations known in the art for object detection and object recognition. Optionally, the processing techniques include filtering from a given captured image unwanted data or noise, applying color or intensity adjustments, applying resolution adjustments, executing feature extraction, performing object integration, performing rotation, performing zooming, performing cropping and several other processing operations for object detection and/or object recognition. Furthermore, the server arrangement 102 is configured to identify each of the objects of interest in the surveillance area based on the extracted features. Notably, the feature extraction techniques are capable of distinguishing a tree from a vehicle, a vehicle from a human, a human from an animal and the like. Furthermore, the feature extraction techniques are employed for determining the structure, size, shape of each of the plurality of objects under analysis. In an example, the object of interest is at least one of: a vehicle, an animal, a building, a person, an obstacle, and so forth.

Optionally, in an example case where the plurality of sensors 104 is a microphone array, a number of microphones are arranged in the surveillance area to monitor sound energy from the surveillance area, and to convert the sound energy into electrical signals that are then converted to acquired data, and to transmit the acquired data to the server arrangement 102 for further processing. The server arrangement 102 is configured to analyze the sound acquired by the microphone array for keywords or content in the sound. A number of audio processing techniques are beneficially employed to extract keywords from the acquired sound; for example, Fast Fourier Transform (FFT) sound signature analysis is implemented. There are several audio processing techniques known in the art such as audio filtering, frequency analysis, audio signature matching, noise cancellation, and the like. In an example, the keywords extracted from the acquired sound are words from a natural language, familiar sounds such as the siren of an ambulance, gunshots sound and the like. In another example, the content extracted from the acquired sound is a voice of a person. The acquired sound is analyzed for a presence of one or more predetermined keywords and content therein, from a set of predetermined keywords and contents. If the analyzed sound contains relevant keywords or content, then the server arrangement 102 calculates a point of origin of the acquired sounds in the surveillance area, related with the presence of one or more of predetermined keyword and content therein based on a direction thereof, with respect to the microphone array.

Further, the server arrangement 102 is configured to determine a type of the object of interest. Herein, the type of object of interest is determined on the basis of features of the object of interest acquired by the plurality of sensors 104. In an example, the object type is a vehicle, an animal, a building, a person, an obstacle, and so forth.

According to an embodiment, the server arrangement 102 is further configured to determine a unique object identity for the object of interest, based on the one or more attributes of the object of interest. The unique object identity is generated based on the one or more attributes for object of interest and the features extracted therefrom. The unique object identity is unique to each of the plurality of objects as the features for each of the objects are different. Notably, in case of two identical vehicles, the distinguishing feature is potentially license numbers on each of the two vehicles. Optionally, the unique object identity is a random number generated by the server arrangement 102 based on the features of the object of interest. In an example, the unique object identity is a feature vector that is generated based on the features extracted from an object. Therefore, the unique object identity generated for each of the plurality of objects is different for two distinguishable objects. However, if the unique object identity is generated more than once for the same object, the generated unique object identity will be same. Notably, the unique object identity for a particular object is location independent, and is dependent on the features of that particular object for which the unique object identity is generated. It will be appreciated that the property of the system 100 of generating the same unique object identity for the same object is advantageous for identifying, locating and tracking the object in the surveillance area without ambiguity.

As aforementioned, the server arrangement 102 is configured to calculate a geospatial location of the object of interest. Notably, the geospatial location of the object of interest is calculated based on a position of the plurality of sensors 104 in the at least one zone. Notably, a geospatial location of each sensor 104 is known to the server arrangement 102, therefore the plurality of sensors 104 serve as reference points for determination of the geospatial location of the identified objects in the surveillance area. The term "geospatial" as used herein refers to mapping of object of interest with respect to the geographical and/or geospatial data, such as Global Positioning System (GPS) data and geographic information system (GIS) data. It will be appreciated in the foregoing that "geospatial location" of a given object is used to refer to a spatial location of the given object, whether indoors or outdoors. When indoors, GPS, for example, is potentially unreliable, in which case one or more other forms of spatial location metrology are employed, for example as recited above; for example, a position of a given object in an indoors environment can be determined from a using a camera to image the given object to generate corresponding image data, and then processing the image data in a computing arrangement implementing image analysis, for example using machine learning or artificial intelligence (AI), for example implemented using IBM's Watson® artificial intelligence computing engine, to identify the given object and its spatial position within the indoors environment.

According to an embodiment, the server arrangement 102 is configured to transform the coordinates of an image plane from the video feed to corresponding coordinates in a map of the surveillance area, for determining the geospatial location of the at least one object of interest. Optionally, the geospatial location of the at least one object of interest is determined by homographic mapping of the surveillance area. Herein, the coordinates of an image plane are transformed from a first reference system to the corresponding coordinates in a map in a second reference system, for calculating the geospatial location of object of interest in the surveillance area. The term "homographic mapping" as used herein refers to mapping the coordinates of an image plane to the geospatial coordinates of a ground plan or a map. Herein, the "ground plan" or "map" refers to a digital image of the surveillance area having at least four known coordinates and the boundary of the four known coordinates of the ground plan or map contains the other unknown coordinates that are required to be retrieved from the map. Herein, the four known coordinates of the map are optionally known positions of the plurality of sensors 104 arranged in the surveillance area. In homographic mapping, at least four points are considered on an image plane marking a closed boundary in the form of a closed geometric shape. In such case, the geometric shape thus formed is a trapezoid. Each of the four points of the trapezoid in the image plane is transformed to the corresponding coordinates in the ground plan or map, thereby geo-referencing the coordinates of the image plane to the ground plan or map. Once a relation has been established between the coordinates of the image plane and the ground plan or map, the coordinates of each of the points within the trapezoid can be determined. Therefore, homography exists between two planes i.e. given four points in a plane, there always exists a relationship that transforms the given four points into corresponding four points in another plane. For this purpose, a homography matrix is determined and subsequently solved to determine the parameters that help in determining the geospatial coordinates of the area. The mapping of the coordinates from an image plane to the map or the ground plane is typically referred to as "geo-referencing".

In an example, a number of cameras are arranged in the surveillance area for acquiring images corresponding to the surveillance area. The homographic mapping of the surveillance area is achieved by dividing the image acquired for whole surveillance area into smaller constituents. Herein, the smaller constituents may be trapezoids. Each of four points of each of the trapezoid, is mapped to the corresponding point on the ground map, thereby establishing a relationship between the acquired image and the ground map. As aforementioned, the relationship between the coordinates of the image plane and the ground map plane is established by the homography matrix. For example, consider a known co-ordinate system (x,y) in a first reference system (image plane) mapped onto an unknown co-ordinate system (X,Y) in a second reference system (map plane) for applying the homographic transformation on one of the trapezoids in the acquired image of the surveillance area. The unknown coordinates are calculated using the formulae:

$$X=(ax+by+c)/(gx+hy+1); \text{ and}$$

$$Y=(dx+ey+f)/(gx+hy+1)$$

wherein, a, b, c, d, e, f, g and h are eight transformation parameters. Herein, 'a' is the fixed scale factor in X direction with scale Y unchanged, 'b' is the scale factor in X direction proportional to Y distance from origin, 'c' is the origin translation in X direction, 'd' is the scale factor in Y direction proportional to X distance from origin, 'e' is the fixed scale factor in Y direction with scale X unchanged, 'f' is the origin translation in Y direction, 'g' is the proportional scale factors X and Y in function of X and 'h' is the proportional scale factors X and Y in function of Y. It will be appreciated that the above mentioned equation contains eight unknown parameters, thereby requiring at least four known points in both the first reference system and the second reference system. Therefore, having known four points or coordinates in the first reference system as (x1, y1), (x2,y2), (x3, y3), (x4, y4) and in the second reference system as (X1, Y1), (X2, Y2), (X3, Y3) and (X4, Y4), the transformation parameters a, b, c, d, e, f, g and h can be calculated.

Notably, the known four points in the first reference system are the coordinates of the trapezoid in the image plane and the known four points in the second reference plane are the coordinates of the trapezoid in the map/ground plane. It will be appreciated that the determination of all the eight parameters from the above homographic transformation matrix allows to transform any point or co-ordinate from the first reference system to the second reference system. Therefore, any point that lies within the co-ordinate boundaries of the trapezoid in the image plane can be geo-referenced to the corresponding coordinates of the trapezoid in the map/ground plane. Notably, the homographic mapping can be extended to mapping using more than four points, such as eight points forming the boundaries of a cuboid.

Furthermore, in order to geo-reference each of the at least one object of interest in the image plane to the map/ground plane, each of the at least one object of interest is first segmented to be represented in a box. Furthermore, a point is determined within the box based on the fact that the point selected within the box accurately represents the spatial depth of the identified object within the box. The term "spatial depth" as used herein refers to the average distance of the identified image from the observed space (here, the sensor or camera). The spatial depth potentially varies from one object type to another. In an example, the spatial depth for a person is a center of the box above the bottom line. In another example, the spatial depth for vehicles is a point up above 20% from a center of the box. The point thus obtained is then transformed into map or ground plan coordinates using the homographic matrix. Henceforth, each of the identified objects can be transformed into map or ground plan coordinates using the homographic matrix.

According to an embodiment, the server arrangement 102 is configured to calculate a change in the geospatial location of the at least one object to be tracked from a first geospatial location to a second geospatial location. Herein, the first geospatial location and the second geospatial location are only indicative of two positions of an object being tracked. Optionally, the objects are tracked in real-time. In such a case, the first geospatial location is the location of the object at time T1 and the second geospatial location is the location of the object at time T2. Notably, the time T2 is ahead in time than time T2. It will be appreciated that the change in the geospatial location of each of the plurality of objects is calculated with respect to time.

Optionally, for the at least one object of interest, the unique object identity and the geospatial location associated therewith is stored in a database (not shown) along with a time stamp. It will be appreciated that the time stamp along with the information facilitates the retrieval of data from the database as and when required. Throughout the present disclosure the term "database" as used herein refers to an organized body of digital information regardless of the manner in which the data or the organized body thereof is represented. Optionally, the database is implemented using hardware, software, firmware and/or any combination thereof. For example, the organized body of related data is in a form of a table, a map, a grid, a packet, a datagram, a file, a document, a list or in any other form. The database includes any data storage software and systems, such as, for example, a relational database like IBM DB2 and Oracle 9. Optionally, the database is used interchangeably herein as database management system, as is common in the art. Furthermore, the database management system refers to the software program for creating and managing one or more databases. Optionally, the database, when in operation, supports relational operations, regardless of whether it enforces strict adherence to the relational model, as understood by those of ordinary skill in the art. Additionally, the information is stored in the cells of the database.

Furthermore, the server arrangement 102 is configured to estimate a state of the at least one object of interest based on the determined one or more attributes of the at least one object of interest and the geospatial location of the at least one object of interest. Herein, the term "state" as used in "state of the object of interest" refers to a condition, appearance, or location of the at least one object of interest at a given time. Notably, the state of the at least one object of interest determines what actions are to be taken in the surveillance area. It will be appreciated that, herein, "type" refers to form or kind the given object (e.g. a bed versus a person versus a wheelchair, "attribute" defines the given object or an arbitrary property of the given object (e.g. clean, unclean or occupied for a bed, and so forth), and "geospatial location" is indicative of the given object's movement (whether inanimate or moving). It will further be appreciated that the state of the at least one object of interest is an indicator of a normalcy or an anomaly in the surveillance area, which is a determinant of actions to be performed in the surveillance area. Notably, an analysis or estimation of the state of the at least one object of interest will be dependent on a type of the object of interest. In an example, when the at least one object of interest is a person, then the state of the object of interest includes one or more of: facial features of the person, facial expressions of the person, physical attributes of the person, a physical condition of the person, a movement of the person and clothing of the person. It will be appreciated that such a state of the person thus estimated is an indicator of a potential change that the person could bring about within the surveillance area. For example, when the facial expressions of the person indicate a state of inebriation, the facial expressions could correspond to a potential danger that the person could pose to other people within the surveillance area (such as, on a street having moving traffic). In another example, a count of a number of males or a number of females can be estimated by analyzing the physical attributes of the person and may further determine a gender ratio at particular place and perform corresponding actions.

Optionally, the at least one object of interest is any animate entity such as an animal; then the state of object of interest includes physical attributes of the animal, a physical condition of the animal, a movement of the animal and the like. In another example, the at least one object of interest is an inanimate entity. Herein the state of the object of interest includes one or more of: a physical condition of the inanimate entity, a working condition of the inanimate entity, a movement of the inanimate entity, a cleanliness condition of the inanimate entity and an occupancy condition of the inanimate entity. In an example, a condition of beds in a hospital can be determined by analyzing the video feeds from cameras in the hospital, and the state can be determined to be 'clean' or 'unclean' based on the analyzed video feed. In another example, movements of vehicles, such as a speed of vehicles on a street, can be analyzed to determine a state of each of the vehicles. In another example, an occupancy condition of one or more parking slots can be determined in an area, by analyzing vacant spaces in the area. In yet another example, working condition of one or more items of machinery or equipment in a factory can be determined using one or more cameras or other sensors that can be used to determine if the one or more items of equipment are in a working condition. In yet another example, a psychological or emotional state of a person such as distress, fear, rage, anger, weariness and the like can be determined by sounds acquired from the surveillance area. It will be appreciated "state" is defined by a type/attribute of a given object; thus, the type, state or attributes of a given object are compared against a set of trigger conditions.

According to an embodiment, the server arrangement 102 is further configured to track a change in the state of the at least one object of interest in the surveillance area. As mentioned hereinbefore, the state of the at least one object of interest can correspond to the condition, appearance, or location of the at least one object of interest at a given time. The server arrangement 102 is configured to track the change in such a condition, appearance, or location of the object of interest within the surveillance area with respect to a passage of time, namely during a time interval. For example, the surveillance area corresponds to a private path to a house that is restricted for entry by persons not having prior permission to access the private path. Furthermore, the plurality of sensors 104 arranged within the surveillance area can comprise a plurality of Close-Circuit Television Cameras (CCTVs) arranged to acquire video feed from the private path as well as a Bluetooth® beacon. In such an example, the server arrangement 102 is configured to determine a presence of a person on the private path not carrying a mobile device having the prior permission to access the private path through use of the Bluetooth® beacon (such that, persons having the prior permission to access the private path can be tracked through communication of the mobile device and the Bluetooth® beacon). In such an example, the server arrangement 102 is configured to track the change in the state of the object of interest, such as, by tracking movement of the person not having the prior permission along the private path and towards the house. In another example, the objects of interest comprise vehicles travelling along a street and the state of the at least one object of interest is associated with a condition of each vehicle determined using sensors implemented as thermal (FLIR) cameras. In such an example, the change in the state of the objects of interest comprises an increase in temperature of a vehicle beyond a predetermined threshold. Correspondingly, such a change in the state of the vehicle can be related to the vehicle catching fire (for example, after an accident). It will be appreciated that data from different types of plurality of sensors 104, such as one or more cameras, microphone arrays, Bluetooth® beacons can be acquired to cumulatively determine a state of the at least one object of interest.

Furthermore, the server arrangement 102 is configured to compare the estimated state of the at least one object of interest with a defined set of trigger conditions associated with the surveillance area. The term "set of trigger conditions" refers to one or more conditions relating state of the at least one object of interest in the surveillance area. The set of trigger conditions define each of conditions relating to troublesome states or situations that potentially occur in the surveillance area corresponding to a particular object of interest. Notably, the set of trigger conditions are defined by a user of the system 100. Throughout the present disclosure, the term "user" as used herein relates to any entity including a person (i.e., human being) or a virtual personal assistant (an autonomous program or a bot) using a device and/or system 100 described herein. Optionally, the set of trigger conditions include one or more of: a count of the at least one object of interest in the surveillance area, a duration of a current state of the at least one object of interest, a frequency of change of the state of the at least one object of interest, and one or more threshold values of a state of the object of interest.

According to an embodiment, the set of trigger conditions are defined based on the at least one zone in the surveillance area. Notably, each of the zones in the surveillance area have a different set of conditions based on properties of the zone. In an example, a surveillance area is divided into two zones, namely a first zone and a second zone. The first zone is a street with moving vehicles, and the second zone is parking area. Herein, in the first zone, the state of objects of interests (herein, vehicles and people) will be a compared with a first set of trigger conditions comprising conditions such as a number of vehicles on the street, a threshold of vehicles on the street and corresponding trigger of red signal and the like. Further, in the second zone the state of objects of interests (herein, vehicles and vacant spaces) will be compared with a second set of trigger conditions, such a number of vehicles in the parking area, a number of vacant spaces in the parking area and corresponding trigger action of notifying a driver of availability of vacant spaces in the parking area.

According to another embodiment, the set of trigger conditions are based on one or more sub-areas that defined inside the zone or the surveillance area. In an example, presence of certain objects in a particular sub-area can trigger an action specifically specified for that sub-area. In particular, the server arrangement is configured to determine an exact position of a particular object within the surveillance area and compare it against a set of trigger conditions associated with the sub-area of the surveillance area. For example, if a work room within a hospital is the surveillance area, a table may be placed in it has two designated areas, namely a first designated area and a second designated area. Herein, the first designated area triggers a pickup for the lab, and the second designated area triggers a pickup to another department. Now, when an object (for example, a blood sample) is placed on one of these areas, a pickup is triggered by sending a message to the external application, here transport staff application with the blood lab as destination. Alternatively, another destination is provided with the trigger, when an object, herein the blood sample, is spotted on the other area of the table. In another example, a section of the room floor may be designated for yet another trigger condition, for example, pick up of contaminated trash, and consecutively sent to a different recipient with proper training or equipment to complete the triggered action.

In yet another embodiment, the set of trigger conditions are based on specific lines defined in the surveillance area. Herein, "lines" refers to certain specific boundaries in the surveillance area, that specified with a set of trigger conditions with respect to certain objects. For example, when an unclean bed crosses the line into a room, the room also receives an unclean attribute, and an action is triggered. In another example, an alarm is triggered when a person that is not recognized as staff crosses a certain line in a hospital, restraint, or any other unauthorized entry in a high security area.

Furthermore, the server arrangement 102 is configured to determine at least one action to be taken in the surveillance area based on the estimated state of the at least one object of interest matching with at least one of the trigger conditions from the defined set of trigger conditions in the comparison. The "at least one action" can comprise a remedial action to be taken to rectify a troublesome situation (such as an unpleasant or dangerous situation) arising within the surveillance area. Thus, when the at least one action is taken, the troublesome situation can be rectified. It will be appreciated that some troublesome situations arising within particular surveillance areas can be rectified without any human-intervention (such as, purely by triggering functioning of one or more automatic devices) whereas others require intervention by one or more people (such as, in addition to triggering functioning of one or more automatic devices). In one example, the surveillance area is an enclosed and stationary space such as a residential establishment and the at least one trigger condition corresponds to an increase in temperature within the residential establishment above a predetermined threshold (such as, 80° C.). In such an example, the server arrangement 102 is configured to determine the at least one action to be taken in the surveillance area as triggering of sprinklers arranged within the residential establishment. Consequently, when the temperature is determined to be more than 80° C. (such as, by one or more thermal cameras installed within the residential establishment), the server arrangement 102 is configured to trigger functioning of the sprinklers. Herein, such sprinklers can be automatically triggered, for example, by sending a corresponding instruction to a controller operatively coupled with the sprinklers. Thus, the sprinkler and the controller form a part of an IoT (or "internet of things") device. In another example, the at least one of the trigger conditions comprises an increase in temperature of a stationary vehicle. It will be appreciated that such a state of the increase in temperature of the stationary vehicle could correspond to the vehicle catching fire after an accident. However, one or more passengers of the vehicle are potentially trapped therein, requiring human-intervention to extract the passengers therefrom. Consequently, the at least one action to be taken can comprise sending an emergency notification to one or more relevant personnel capable of remediating the situation, such as, firefighters, policemen, ambulance and the like.

Optionally, the at least one action includes one or more of: sending data to a node, sending a text message or an email message to one or more recipients, displaying information on a screen, and activating a device. It will be appreciated that the at least one action to be taken to rectify a troublesome situation depends upon various factors, such as, a nature of the surveillance area, a type of the object, change arising within the state of the object and the like. Correspondingly, the at least one action to be taken can be associated with the different situations respectively. For example, when the troublesome situation is associated with presence of a person not having an appropriate permission to visit a private area, the at least one action to be taken includes displaying information on a screen associated with a mobile device (such as a smartphone) of the person that they may be prosecuted for being present in the area beyond a predetermined duration (such as, for more than two minutes). In another example, when the troublesome situation is associated with an accident occurring on a street, the at least one action includes transmitting an emergency notification as a text message or an email to each of a firefighting agency, police, ambulance and the like about the accident, a geospatial location associated with the accident, one or more images associated with the accident and optionally, one or more remedial actions to be taken to rectify the situation.

Optionally, the at least one action includes sending the sensor data including the determined at least one object of interest, an estimated state of the at least one object of interest and the geospatial location thereof, that triggered the at least one action to a remote user device for verification by a user, before the actual action is triggered (e.g. raise fire alarm) in the surveillance area. In an example, the sensor data is rendered on the user device as a graphical and/or virtual representation. Optionally, the user device comprises a display to render the virtual representation of a movement and/or state of the objects of interest in the surveillance area. Throughout the present disclosure, the term "user device" as used herein refers to an electronic device associated with (or used by) a user that is capable of enabling the user to perform specific tasks associated with the system 100. Furthermore, the user device is intended to be broadly interpreted to include any electronic device that is useable for voice and/or data communication over a wireless communication network. Examples of user device include, but are not limited to, cellular phones, personal digital assistants (PDAs), handheld devices, wireless modems, laptop computers, personal computers, etc. Moreover, the user device is optionally alternatively referred to as a mobile station, a mobile terminal, a subscriber station, a remote station, a user terminal, a terminal, a subscriber unit, an access terminal, etc. Additionally, the user device includes a casing, a memory, a processor, a network interface card, a microphone, a speaker, a keypad, and a display. Moreover, the user device is to be construed broadly, so as to encompass a variety of different types of mobile stations, subscriber stations or, more generally, communication devices, including examples such as a combination of a data card inserted in a laptop.

In an exemplary implementation, the server arrangement 102 is configured to send verification data (herein, the data analyzed for determination of at least action to be triggered) to a plurality of user devices, such as 10 smartphones associated with officials of concerned authorities. Herein, the determined action is triggered in the surveillance area when a predefined number of positive responses are received from the plurality of user devices. For example, if 6 out of 10 user devices respond positively to the verification data, then the determined action is triggered in the surveillance area. In an alternative scenario, the determined action is not triggered in the surveillance area, when a predefined number of negative responses are received from the plurality of user devices. In such a case, the server arrangement 102 is configured to retrain the machine learning algorithms used to detect objects and object states to improve detection accuracy. It will be appreciated that such a system 100 enhances accuracy of the system 100, and mitigates any false alarms or actions that may have been triggered in future in the surveillance area.

Optionally, the server arrangement 102 is further configured to mark the triggered at least one action as complete or incomplete based on the change in state of the at least one object of interest. The server arrangement 102 is further configured to determine to track changes in the state of the at least one object of interest in the surveillance area, after at least one action to be taken in the surveillance area. Subsequently, the server arrangement 102 is configured to compare the determined state of the object of interest with a rectified state of the object. The term "rectified state of the object" corresponds to an ideal state of the object that is not associated with a troublesome situation within the surveillance area. Such a state of the at least one object can result as a direct consequence of the at least one action taken within the surveillance area. For example, when the at least one action taken within the surveillance area is associated with triggering of sprinklers within the surveillance area to decrease a temperature therein (wherein the temperature had previously increased due to ignition of an unrequired fire within the surveillance area), then the server arrangement 102 is configured to determine the decrease in the temperature to a value less than or equal to 35° C. (associated with an ideal room temperature), and mark the action of triggering of sprinklers as complete. In another example, when the at least one action taken within the surveillance area is associated with eviction of a person without appropriate permission to access a private area, the server arrangement 102 is configured to determine absence of such a person from the private area, such as, due to one or more security personnel evicting the person upon receiving a corresponding notification. Alternatively, the server arrangement 102 can be configured to determine the person possessing the appropriate permission to access the private area, such as, after informing the person that the permission can be obtained by following one or more required steps (for example, by paying a fees associated with receiving the permission), following which the action is marked as 'complete' by the server arrangement 102 It will be appreciated that the function of marking a triggered action as 'complete' or 'incomplete' ensures that the same action is not repeated twice in the surveillance area.

Furthermore, the system 100 comprises the programming interface 106 in communication with the server arrangement 102 and at least one external application 108. Throughout the present disclosure, the term "programming interface" as used herein refers to a set of functions that can be called from an application program to access features of another program. Herein, the programming interface 106 is configured to access features of the external application 108. Furthermore, the programming interface 106, or sometimes referred to as application programming interface (API) is a software interface that includes one or more routines, data structures, object classes, and/or protocols that support the interaction of an archiving platform and a storage system. A programming interface 106, for example, includes building blocks for enabling the building of a software application that is consistent with a particular application or operating environment. The programming interface 106 can be specified in terms of a programming language that can be compiled at application build time. It will be appreciated that the programming interface 106 acts as an intermediary application between the server arrangement 102 and the at least one external application 108. Herein, the programming interface 106 is beneficially used to enable external applications 108 to programmatically create, read, update, and/or delete trigger actions.

Throughout the present disclosure, the term "external application" as used in "at least one external application" refers to a software application, device, or server that when triggered by the programming interface 106, is configured to perform the at least one action as determined according to the estimated state of the at least one object of interest. Optionally, the external application 108 includes one or more messaging services, dedicated application-based applications, alarm systems, alert generation systems, water sprinkler systems, and so forth. It will be appreciated that the external application 108 is any application that is communicatively coupled to the server arrangement, and is configured to receive commands to execute the at least one action in the surveillance area. Herein, the programming interface 106 is configured to trigger the at least one external application 108 to perform the determined at least one action to be taken when the estimated state of the object of interest matches with at least one of the trigger conditions from the defined set of trigger conditions. Notably, the programming interface 106 identifies one or more external applications that are required to be accessed according to the estimated state of the object of interest. Therefore, once identified, the programming interface 106 is configured to send a connection request or a trigger request, for example, a HTTP connection request, in order to initiate the determined at least one action to be determined.

In an exemplary implementation, the system 100 is employed to control display of advertising material in the surveillance area. For example, the plurality of sensors 104 installed in a shopping mall or a street (herein, the surveillance area) are configured to capture constantly images or videos of people in the street. The server arrangement 102 is configured to receive such data from the sensors 104 and further to determine one or more attributes of the people on the street in real-time, in order to determine a count of people belonging to a particular gender. The system 100 is further configured to send a signal to one or more display devices for displaying gender specific advertisements in the street according to the analyzed data. For example, women-centric advertisements, such as women clothes, apparels, accessories, footwear, cosmetics are displayed when it has been determined that there are a majority of women in the street.

In another exemplary implementation, the system 100 is employed to trigger an action in the surveillance area based on a cumulative data acquired by varied sensors 104 in the surveillance area. For example, the plurality of sensors 104 including one or more cameras and microphone arrays are installed in a street (herein, the surveillance area) for continuously monitoring activities on the street. In a specific scenario, when the video feed captures a gun in the street, armed men or women, and the microphone array captures sound of people crying for help, the combined acquired data from both the cameras and the microphone array suggests a threat in the street, and thereby an action is triggered in the street, such as sending calls, emails, SOS to an external application 108 associated with concerned authorities. Optionally, the actions also include alerting people in the nearby streets, diverting traffic, and so forth.

In yet another exemplary implementation, the system 100 is employed to provide cleanliness facilities in a surveillance area. For example, a number of cameras are installed in a hospital (herein, the surveillance area) to monitor constantly a state of hospital beds in each of the rooms of the hospital. The server arrangement 102 is configured to receive data pertaining to one or more attributes of the bed, such as orientation of the bed, one or more unwanted objects on the bed, misplaced bedsheets and so forth, in order to determine a cleanliness state of the hospital beds. The system 100 is further configured to determine the state of the beds as 'clean' or 'unclean' based on the analyzed one or more attributes, and compare the state with defined set of trigger conditions. Herein, optionally, the trigger condition is that, if the state is 'clean', no action is taken, and if the state is 'unclean' an action is triggered. For example, if the state of a particular bed is determined to be 'unclean', a message is sent to concerned staff along with a position, such as the room number, indicating that the particular bed needs to be cleaned. Once the bed is in a cleaned state, the action is marked as 'complete'. In another example, if it is determined that a bed, marked as 'clean', has been moved from a clean room to an unclean room, then that particular bed may be marked 'unclean', for further action.

Figure 2:
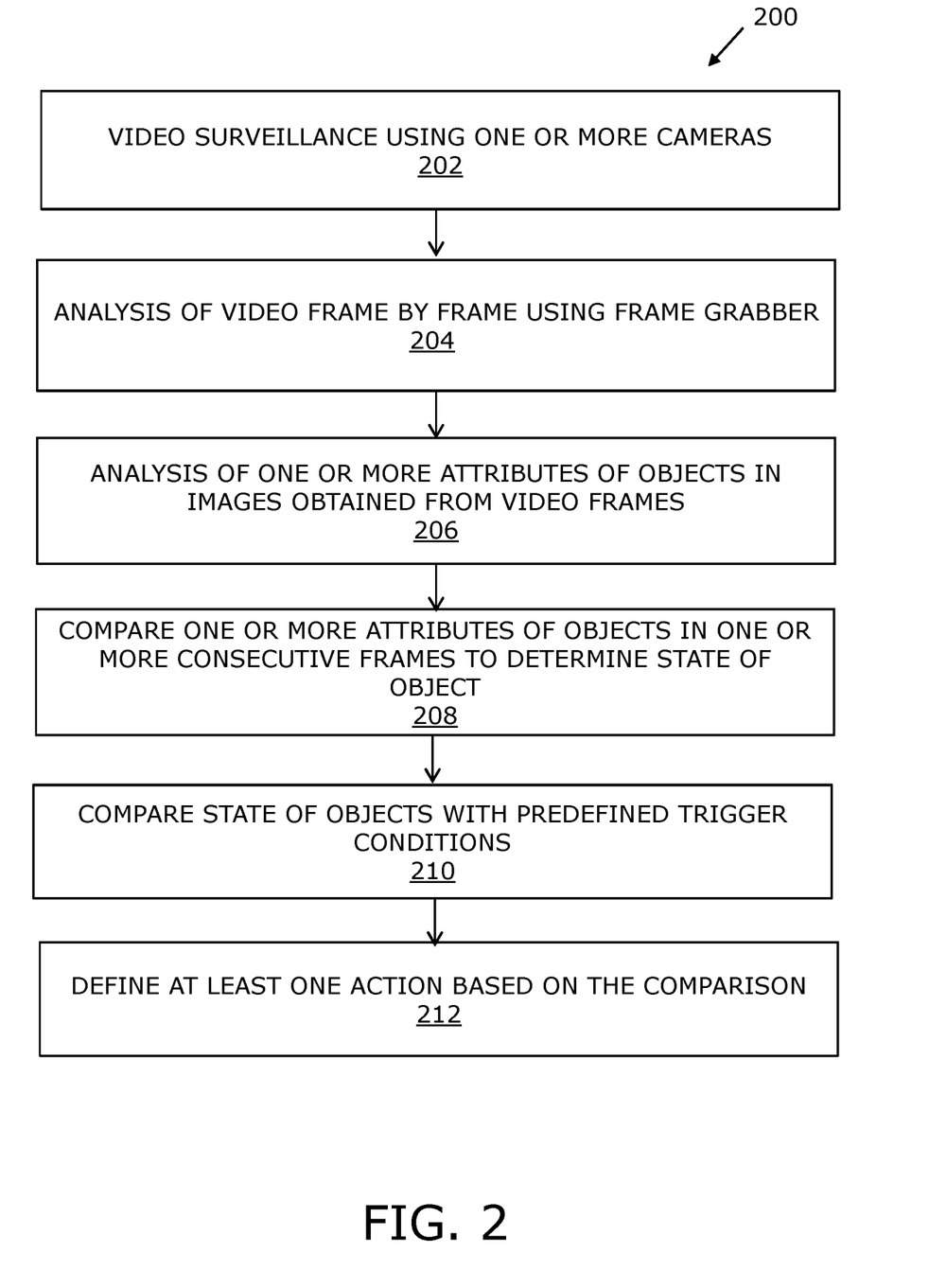
FIG. 2 is an illustration of a flowchart depicting steps of a method for triggering action in a surveillance area based on video feed, in accordance with an embodiment of the present disclosure.

Referring to FIG. 2, there is shown therein a flowchart 200 depicting steps of a method for triggering action in a surveillance area based on video feed, in accordance with an embodiment of the present disclosure. At a step 202, video feed is acquired from one or more cameras arranged in the surveillance area. At a step 204, the video feed acquired from the one or more cameras is analyzed frame-by-frame using a frame grabber. Herein, the frame grabber analyzes the video feed per frame to determine at least one object of interest in the surveillance area. At a step 206, the at least one object of interest is analyzed to determine one or more attributes of the at least one object of interest. At step 208, the determined one or more attributes of the at least one object of interest are compared in one or more consecutive frames of the video feed to determine a state of the at least one object of interest. At a step 210, the determined state of the at least one object of interest is compared with a set of predefined trigger conditions. At a step 212, at least once action to be taken in the surveillance area is determined.

Figure 3:
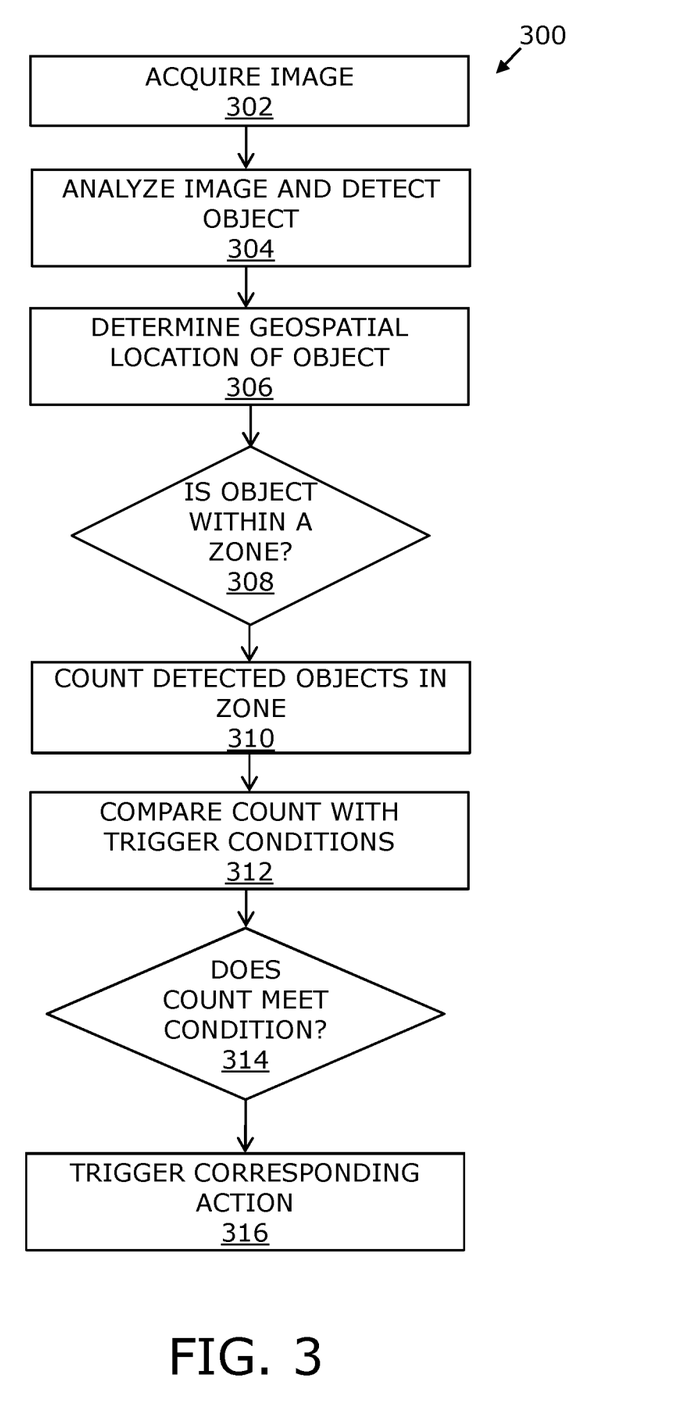
FIG. 3 is an illustration of a flowchart depicting steps of a method for triggering actions in a zone of a surveillance area, in accordance with an embodiment of the present disclosure.

Referring to FIG. 3, there is shown a flowchart 300 depicting steps of a method for triggering actions in a zone of a surveillance area, in accordance with an embodiment of the present disclosure. At a step 302, data relating to images in the surveillance area is acquired. At a step 304, the images are analyzed to detect at least one object of interest in the surveillance area. At a step 306, a geospatial location of the at least one object of interest is determined. At a step 308, a decision is made that whether or not the at least one object of interest lies in a particular zone. If yes, then there is further determined the zone in which the object of interest is located in real-time. At a step 310, a number of detected objects of interest are counted that are located in the particular zone. At a step 312, the count is compared with a trigger condition. At a step 314, a decision is made to determine whether or not the count meets criteria specified to invoke a trigger condition. At a step 316, corresponding actions are triggered in the particular zone, if the count meets the criteria specified to invoke the trigger condition.

Figure 4:
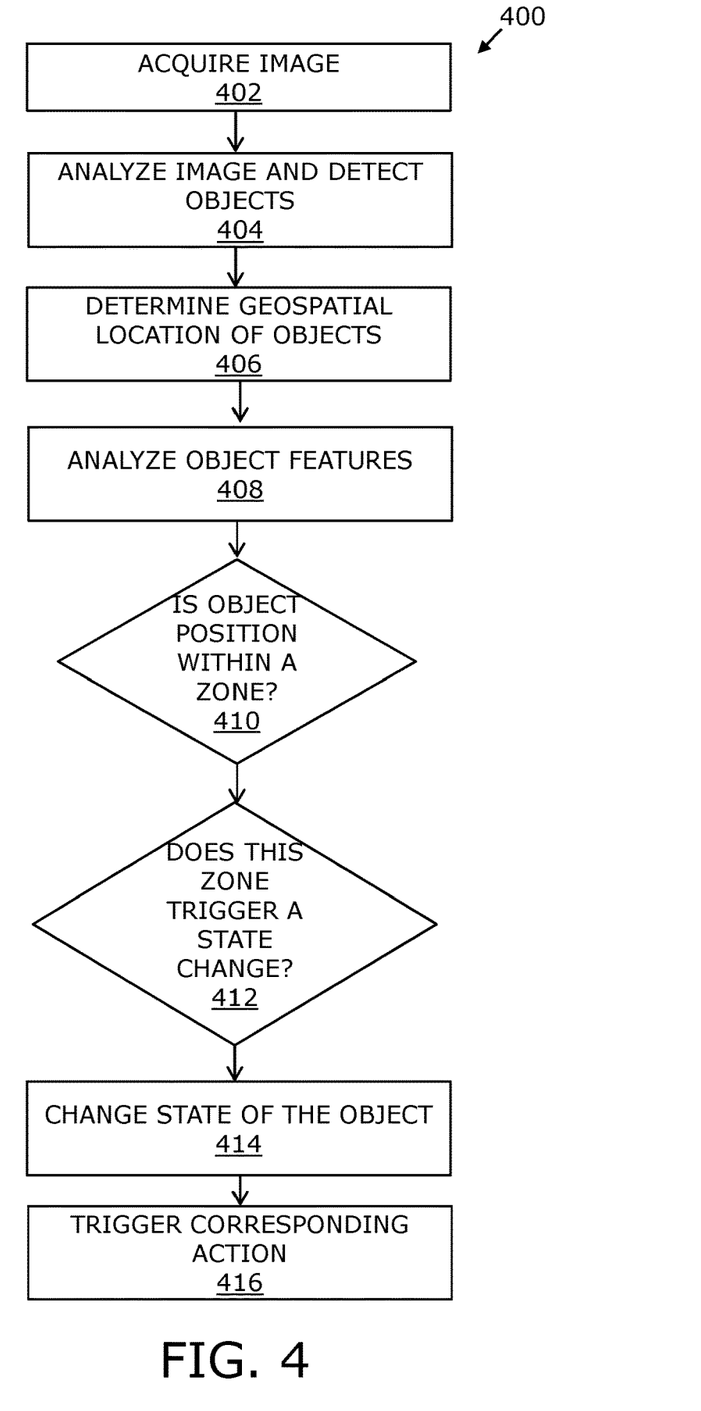
FIG. 4 is an illustration of a flowchart depicting steps of method for triggering actions in a zone of a surveillance area, in accordance with an embodiment of the present disclosure.

Referring to FIG. 4, there is shown an illustration of a flowchart 400 depicting steps of a method for triggering actions in a zone of a surveillance area, in accordance with an embodiment of the present disclosure. At a step 402, data relating to images in the surveillance area is acquired. At a step 404, the images are analyzed to detect at least one object of interest in the surveillance area. At a step 406, a geospatial location of the at least one object of interests is determined. At a step 408, one or more attributes of the at least one object of interest are analyzed to determine a state of the at least one object of interest. At a step 410, a decision is made to determine whether or not the at least one object of interest lies in a particular zone. If yes, then the step 410 includes further determining the particular zone in which the at least one object of interest is located in real-time. At a step 412, there is determined whether or not the particular zone triggers a change of state of the at least one object of interest. At a step 414, the state of the at last one object of interest is updated corresponding to the state of the zone, if the zone triggers a change of state of the object of interest. At a step 416, corresponding action is triggered in the zone of the surveillance area.

The present disclosure also relates to the method of triggering actions in a surveillance area. Various embodiments and variants disclosed above apply mutatis mutandis to the method.

Figure 5:
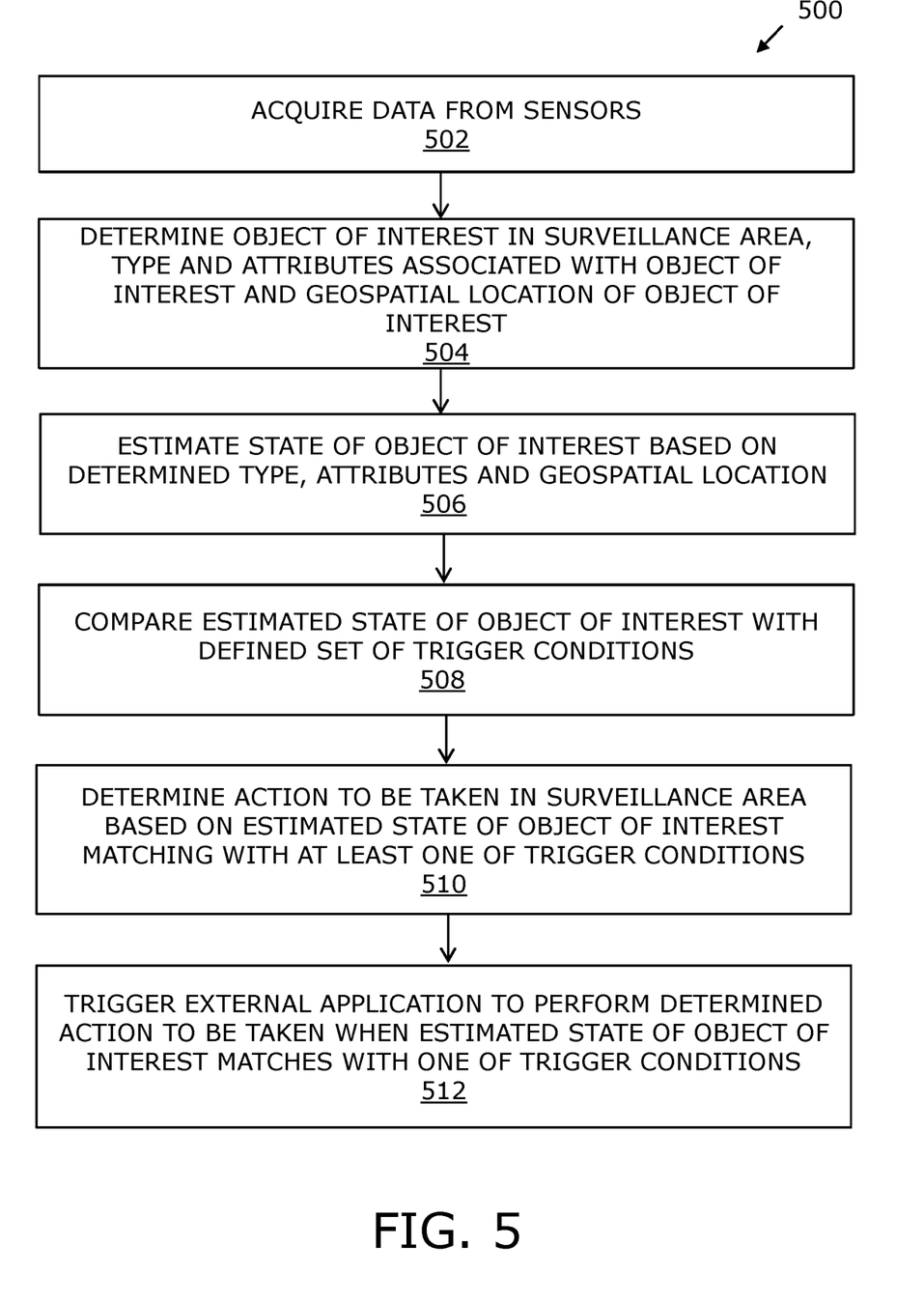
FIG. 5 is an illustration of a flowchart depicting steps of a method for triggering actions in a surveillance area, in accordance with an embodiment of the present disclosure.

Referring to FIG. 5, there is shown an illustration of a flowchart 500 depicting steps of a method for triggering actions in a surveillance area, in accordance with an embodiment of the present disclosure. At a step 502, data is acquired from a plurality of sensors. At a step 504, the acquired data is analyzed to determine at least one object of interest in the surveillance area, a type of the at least one object of interest, one or more attributes associated with the at least one object of interest and a geospatial location of the object of interest. At a step 506, a state of the at least one object of interest is estimated based on the determined type of the at least one object of interest, one or more attributes of the at least one object of interest and the geospatial location of the at least one object of interest. At a step 508, the estimated state of the at least one object of interest is compared with a defined set of trigger conditions associated with the surveillance area. At a step 510, at least one action to be taken is determined in the surveillance area based on the estimated state of the object of interest matching with at least one of the trigger conditions from the defined set of trigger conditions in the comparison. At a step 512, the at least one external application is triggered to perform the determined at least one action to be taken when the estimated state of the at least one object of interest matches with at least one of the trigger conditions from the defined set of trigger conditions.

The steps 502 to 512 are only illustrative and other alternatives can also be provided where one or more steps are added, one or more steps are removed, or one or more steps are provided in a different sequence without departing from the scope of the claims herein.

Optionally, the method further comprises tracking a change in the state of the at least one object of interest in the surveillance area.

Optionally, the method further comprises marking the triggered at least one action as complete or incomplete based on the change in state of the at least one object of interest.

Optionally, the method further comprises defining at least one zone in the surveillance area, wherein the set of trigger conditions are defined based on the at least one zone in the surveillance area.

Optionally, the object of interest is a person, and wherein the state of the object of interest includes one or more of: facial features of the person, facial expressions of the person, physical attributes of the person, a physical condition of the person, a movement of the person and clothing of the person.

Optionally, the object of interest is an inanimate entity, and wherein the state of the at least one object of interest includes one or more of: a physical condition of the inanimate entity, working condition of the inanimate entity, movement of the inanimate entity, cleanliness condition of the inanimate entity and occupancy condition of the inanimate entity.

Optionally, the set of trigger conditions include one or more of: a count of the at least one object of interest in the surveillance area, a duration of a current state of the at least one object of interest, a frequency of change of the state of the at least one object of interest, and one or more threshold values of a state of the at least one object of interest.

Optionally, the at least one action includes one or more of: sending data to a node, sending a text message or an email message to one or more recipients, displaying information on a screen, and activating a device.

Optionally, the method further comprises transforming the coordinates of an image plane from the video feed to corresponding coordinates in a map of the surveillance area, for determining the geospatial location of the at least one object of interest.

Optionally, the method further comprises determining a unique object identity for the object of interest based on the one or more attributes of the object of interest.

Optionally, the plurality of sensors comprises one or more cameras configured to capture video feed of the surveillance area.

Optionally, the method further comprises capturing one or more image frames from the video feed for analysis.

Optionally, the plurality of sensors comprises one or more of a RADAR, a LIDAR, a Bluetooth® beacon, a microphone array, an ultra-wide band beacon, a proximity sensor, and a combination of cell tower.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system comprising:
a server arrangement in communication with a plurality of sensors arranged in a surveillance area, wherein the server arrangement is configured to:
acquire data from the plurality of sensors;
analyze the acquired data to determine at least one object of interest in the surveillance area, a type of the at least one object of interest, one or more attributes associated with the at least one object of interest and a geospatial location of the at least one object of interest;
calculate a change in the geospatial location of the at least one object of interest for tracking the at least one object of interest from a first geospatial location to a second geospatial location;
estimate a state of the at least one object of interest within the surveillance area based on the type of the at least one object of interest, the determined one or more attributes of the at least one object of interest and the calculated change in the geospatial location of the at least one object of interest;
compare the estimated state of the at least one object of interest with a defined set of trigger conditions associated with the surveillance area; and
determine at least one action to be taken in the surveillance area based on the estimated state of the at least one object of interest matching with at least one of the trigger conditions from the defined set of trigger conditions in the comparison; and
a programming interface in communication with the server arrangement and at least one external application, wherein the programming interface is configured to trigger the at least one external application to perform the determined at least one action to be taken when the estimated state of the at least one object of interest matches with at least one of the trigger conditions from the defined set of trigger conditions.

2. The system according to claim 1, wherein the server arrangement is further configured to track change in the state of the at least one object of interest in the surveillance area.

3. The system according to claim 2, wherein the server arrangement is further configured to mark the triggered at least one action as complete or incomplete based on the change in state of the at least one object of interest.

4. The system according to claim 1, wherein the server arrangement is further configured to define at least one zone in the surveillance area, wherein the set of trigger conditions are defined based on the at least one zone in the surveillance area.

5. The system according to claim 1, wherein the at least one object of interest is a person, and wherein the state of the at least one object of interest includes one or more of: facial features of the person, facial expressions of the person, physical attributes of the person, a physical condition of the person, a movement of the person and clothing of the person.

6. The system according to claim 1, wherein the at least one object of interest is an inanimate entity, and wherein the state of the at least one object of interest includes one or more of: a physical condition of the inanimate entity, a working condition of the inanimate entity, a movement of the inanimate entity, a cleanliness condition of the inanimate entity and an occupancy condition of the inanimate entity.

7. The system according to claim 1, wherein the set of trigger conditions include one or more of: a count of the at least one object of interest in the surveillance area, a duration of a current state of the at least one object of interest, a frequency of change of the state of the at least one object of interest, and one or more threshold values of a state of the object of interest.

8. The system according to claim 1, wherein the at least one action includes one or more of: sending data to a node, sending a text message or an email message to one or more recipients, displaying information on a screen, and activating a device.

9. The system according to claim 1, wherein the server arrangement is configured to transform the coordinates of an image plane from the video feed to corresponding coordinates in a map of the surveillance area, for determining the geospatial location of the at least one object of interest.

10. The system according to claim 1, wherein the server arrangement is further configured to determine a unique object identity for the at least one object of interest based on the one or more attributes of the at least one object of interest.

11. The system according to claim 1, wherein the plurality of sensors comprises one or more cameras configured to capture video feed of the surveillance area.

12. The system according to claim 11, wherein the server arrangement is configured to capture one or more image frames from the video feed for analysis.

13. The system according to claim 1, wherein the plurality of sensors comprises one or more of a RADAR, a LIDAR, a Bluetooth® beacon, a microphone array, an ultrawide band beacon, a proximity sensor, and a combination of cell tower.

14. A method comprising:
acquiring data from a plurality of sensors;
analyzing the acquired data to determine at least one object of interest in the surveillance area, a type of the at least one object of interest, one or more attributes associated with the at least one object of interest and a geospatial location of the at least one object of interest;
calculating a change in the geospatial location of the at least one object of interest for tracking the at least one object of interest from a first geospatial location to a second geospatial location;
estimating a state of the at least one object of interest based on the determined type of the at least one object of interest, one or more attributes of the at least one object of interest and the calculated change in the geospatial location of the at least one object of interest;
comparing the estimated state of the at least one object of interest with a defined set of trigger conditions associated with the surveillance area; and
determining at least one action to be taken in the surveillance area based on the estimated state of the at least one object of interest matching with at least one of the trigger conditions from the defined set of trigger conditions in the comparison; and
triggering the at least one external application to perform the determined at least one action to be taken when the estimated state of the at least one object of interest matches with at least one of the trigger conditions from the defined set of trigger conditions.

15. The method according to claim 14, further comprising tracking a change in the state of the at least one object of interest in the surveillance area.

16. The method according to claim 15, further comprising marking the triggered at least one action as complete or incomplete based on the change in state of the at least one object of interest.

17. The method according to claim 14, further comprising defining at least one zone in the surveillance area, wherein the set of trigger conditions are defined based on the at least one zone in the surveillance area.

18. The method according to claim 14, wherein the at least one object of interest is a person, and wherein the state of the at least one object of interest includes one or more of: facial features of the person, facial expressions of the person, physical attributes of the person, a physical condition of the person, a movement of the person and clothing of the person.

19. The method according to claim 14, wherein the at least one object of interest is an inanimate entity, and wherein the state of the at least one object of interest includes one or more of: a physical condition of the inanimate entity, a working condition of the inanimate entity, a movement of the inanimate entity, a cleanliness condition of the inanimate entity and an occupancy condition of the inanimate entity.

20. The method according to claim 14, wherein the set of trigger conditions include one or more of: a count of the at least one object of interest in the surveillance area, a duration of a current state of the at least one object of interest, a frequency of change of the state of the at least one object of interest, and one or more threshold values of a state of the object of interest.

21. The method according to claim 14, wherein the at least one action includes one or more of: sending data to a node, sending a text message or an email message to one or more recipients, displaying information on a screen, and activating a device.

22. The method according to claim 14, further comprising transforming the coordinates of an image plane from the video feed to corresponding coordinates in a map of the surveillance area, for determining the geospatial location of the at least one object of interest.

23. The method according to claim 14, further comprising determining a unique object identity for the at least one object of interest based on the one or more attributes of the at least one object of interest.

24. The method according to claim 14, wherein the plurality of sensors comprises: one or more cameras configured to capture video feed of the surveillance area.

25. The method according to claim 24, further comprising capturing one or more image frames from the video feed for analysis.

26. The method according to claim 14, wherein the plurality of sensors comprises one or more of a RADAR, a LIDAR, a Bluetooth® beacon, a microphone array, an ultra-wide band beacon, a proximity sensor, and a combination of cell tower.

* * * * *